United States Patent
Xi et al.

(10) Patent No.: US 11,168,908 B2
(45) Date of Patent: Nov. 9, 2021

(54) AIR CONDITIONER, AND CONTROL METHOD AND APPARATUS THEREFOR

(71) Applicants: GD MIDEA AIR-CONDITIONING EQUIPMENT CO., LTD., Foshan (CN); MIDEA GROUP CO., LTD., Foshan (CN)

(72) Inventors: Zhanli Xi, Foshan (CN); Jinbo Li, Foshan (CN); Bobo Zhang, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 50 days.

(21) Appl. No.: 16/767,515

(22) PCT Filed: Dec. 21, 2017

(86) PCT No.: PCT/CN2017/117829
§ 371 (c)(1),
(2) Date: May 27, 2020

(87) PCT Pub. No.: WO2019/104789
PCT Pub. Date: Jun. 6, 2019

(65) Prior Publication Data
US 2020/0378637 A1 Dec. 3, 2020

(30) Foreign Application Priority Data

Nov. 29, 2017 (CN) .......................... 201711228104.8
Nov. 29, 2017 (CN) .......................... 201711229311.5

(51) Int. Cl.
*F24F 11/77* (2018.01)
*F24F 11/86* (2018.01)
(Continued)

(52) U.S. Cl.
CPC .......... *F24F 11/0008* (2013.01); *F24F 11/77* (2018.01); *F24F 11/86* (2018.01); *F24F 2110/10* (2018.01); *F24F 2110/20* (2018.01)

(58) Field of Classification Search
CPC ........ F24F 11/0008; F24F 11/77; F24F 11/86; F24F 2110/20; F24F 2110/10
See application file for complete search history.

(56) References Cited

U.S. PATENT DOCUMENTS 5,850,968 A 12/1998 Jokinen
11,112,133 B2 * 9/2021 Dostmann ................ F24F 11/30
(Continued)

FOREIGN PATENT DOCUMENTS

CN 103743061 A 4/2014
CN 104374037 A 2/2015
(Continued)

OTHER PUBLICATIONS

The State Intellectual Property Office of PRC (SIPO) The First Office Action For CN Application No. 201711228104.8, dated Apr. 10, 2019 22 Pages (Translation Included).
(Continued)

*Primary Examiner* — Nelson J Nieves
(74) *Attorney, Agent, or Firm* — Anova Law Group, PLLC

(57) ABSTRACT

A method for controlling an air conditioner includes obtaining initial indoor ambient temperature and humidity, obtaining an initial dew point temperature according to the initial indoor ambient temperature and humidity, controlling a temperature of an indoor heat exchanger coil to be equal to the initial dew point temperature and maintaining a current operating frequency of a compressor unchanged, obtaining a current indoor ambient temperature, judging whether the current indoor ambient temperature is lower than or equal to
(Continued)

a set temperature, if so, obtaining a current indoor ambient humidity and obtaining a current moisture content and a current dew point temperature according to the current indoor ambient temperature and the current indoor ambient humidity, and controlling the air conditioner to perform humidification or dehumidification according to the temperature of the indoor heat exchanger coil, the current moisture content, and the current dew point temperature.

18 Claims, 7 Drawing Sheets

(51) Int. Cl.
*F24F 11/00* (2018.01)
*F24F 110/20* (2018.01)
*F24F 110/10* (2018.01)

(56) References Cited

U.S. PATENT DOCUMENTS

| | | | | |
|---|---|---|---|---|
| 2010/0204838 A1* | 8/2010 | DiPaolo | ................ | F25B 49/025 700/278 |
| 2010/0293976 A1* | 11/2010 | Tsutsumi | ............ | F24F 1/00077 62/176.6 |
| 2012/0247133 A1* | 10/2012 | Kao | ........................ | F24F 11/77 62/93 |
| 2013/0233933 A1* | 9/2013 | Dostmann | ................ | F24F 11/30 236/44 A |
| 2014/0053580 A1* | 2/2014 | Ferreira | .................. | C02F 1/045 62/80 |
| 2016/0290675 A1* | 10/2016 | Hashino | ................ | F24F 12/006 |

FOREIGN PATENT DOCUMENTS

| | | |
|---|---|---|
| CN | 104930656 A | 9/2015 |
| CN | 104949270 A | 9/2015 |
| CN | 105318504 A | 2/2016 |
| CN | 105526678 A | 4/2016 |
| CN | 106322663 A | 1/2017 |
| CN | 107202386 A | 9/2017 |
| CN | 107270470 A | 10/2017 |
| JP | 39310927 A | 12/1997 |
| JP | 2006170503 A | 6/2006 |
| JP | 2015059691 A | 3/2015 |
| JP | 5104303 B2 | 3/2017 |
| WO | 2014126046 A1 | 8/2014 |

OTHER PUBLICATIONS

The State Intellectual Property Office of PRC (SIPO) The First Search For CN Application No. 201711228104.8, dated Mar. 27, 2019 2 Pages.
The State Intellectual Property Office of PRC (SIPO) The Supplementary Search For CN Application No. 201711228104.8, May 23, 2019 2 Pages.
The State Intellectual Property Office of PRC (SIPO) The First Office Action For CN Application No. 201711229311.5, dated Mar. 15, 2019 7 Pages (Translation Included ).
The World Intellectual Property Organization (WIPO) International Search Report and Written Opinion for PCT/CN2017/117829 dated Aug. 14, 2018 12 Pages.

* cited by examiner

AIR CONDITIONER, AND CONTROL METHOD AND APPARATUS THEREFOR

CROSS-REFERENCE TO RELATED APPLICATIONS

This application is a National Stage Entry under 35 U.S.C. § 371 of International Application No. PCT/CN2017/117829, filed Dec. 21, 2017, which claims priority to Chinese Application Nos. 201711229311.5 and 201711228104.8, both filed Nov. 29, 2017, the entire contents of all of which are incorporated herein by reference.

TECHNICAL FIELD

The present disclosure relates to the field of air conditioner technology, and more particularly relates to a method for controlling an air conditioner, a computer readable storage medium, an apparatus for controlling an air conditioner, and an air conditioner.

BACKGROUND

During a cooling operation of an air conditioner, before the indoor temperature reaches a set temperature, the compressor often runs at a highest frequency for cooling, which causes a temperature of an indoor heat exchanger coil to be too low, so that the temperature drops with continuous dehumidification.

In a region with a dry climate, such as Northern China, it's usually dry indoor. The above-mentioned operation may further increase a human body's discomfort due to low humidity.

SUMMARY

The present disclosure aims to solve at least one of the technical problems existing in related arts to at least some extent. Accordingly, an objective of the present disclosure is to provide a method for controlling an air conditioner, which can sufficiently satisfy a user's requirement for a comfortable humidity level.

A second objective of the present disclosure is to provide a computer-readable storage medium.

A third objective of the present disclosure is to provide an apparatus for controlling an air conditioner.

A fourth objective of the present disclosure is to provide an air conditioner.

In order to realize the above objectives, a method for controlling an air conditioner is provided according to a first aspect of the present disclosure, where the method includes following steps: obtaining an initial indoor ambient temperature and an initial indoor ambient humidity, when the air conditioner is turned on; obtaining an initial dew point temperature, according to the initial indoor ambient temperature and the initial indoor ambient humidity; controlling a temperature of an indoor heat exchanger coil of the air conditioner to be equal to the initial dew point temperature, and maintaining a current operating frequency of a compressor of the air conditioner unchanged; obtaining a current indoor ambient temperature, and judging whether the current indoor ambient temperature is lower than or equal to a set temperature; obtaining a current indoor ambient humidity if the current indoor ambient temperature is lower than or equal to the set temperature, and obtaining a current moisture content and a current dew point temperature according to the current indoor ambient temperature and the current indoor ambient humidity; controlling the air conditioner to perform humidification or dehumidification, according to the temperature of the indoor heat exchanger coil, the current moisture content and the current dew point temperature.

In the method for controlling an air conditioner according to an embodiment of the present disclosure, when an air conditioner is turned on, an initial dew point temperature may be obtained according to an initial ambient condition, and a temperature of the indoor heat exchanger coil of the air conditioner may be maintained at an initial dew point temperature, in order to prevent the air conditioner from performing dehumidification during a cooling control process. After an indoor temperature reaches a set temperature of the air conditioner, the air conditioner may be controlled to perform humidification or dehumidification according to a temperature of the indoor heat exchanger coil, a current moisture content and a current dew point temperature. Therefore, a user's requirement for comfortable humidity can be sufficiently satisfied, and effective control of humidity can be achieved without a need for additional humidity sensor, but only with a need for basic parts of the air conditioner, such that cost can also be reduced.

The method for controlling an air conditioner according to the embodiment described above, may also include additional technical features as follows:

judging, when the current indoor ambient temperature is higher than the set temperature, whether the indoor ambient temperature remains unchanged within a first preset time, and controlling, if the indoor ambient temperature remains unchanged within the first preset time, to decrease the temperature of the indoor heat exchanger coil.

Specifically, controlling the air conditioner to perform humidification or dehumidification according to the temperature of the indoor heat exchanger coil, the current moisture content and the current dew point temperature, includes: judging the current moisture content, and judging a magnitude relation between the temperature of the indoor heat exchanger coil and the current dew point temperature; controlling to decrease a rotational speed of an indoor fan of the air conditioner for dehumidification, if the current moisture content is greater than a first preset value and the temperature of the indoor heat exchanger coil is higher than the current dew point temperature; controlling to increase a rotational speed of the indoor fan of the air conditioner for humidification, if the current moisture content is lower than a second preset value and the temperature of the indoor heat exchanger coil is lower than the current dew point temperature, where the second preset value is lower than the first preset value.

According to an embodiment of the present disclosure, the first preset value is a moisture content corresponding to a temperature of 26° C. and a humidity of 60%, the second preset value is a moisture content corresponding to a temperature of 26° C. and a humidity of 40%.

According to an embodiment of the present disclosure, the method for controlling the air conditioner further includes: obtaining the set temperature and the set humidity, when the air conditioner is in cooling operation; obtaining a set moisture content, according to the set temperature and the set humidity; obtaining a current indoor ambient temperature, a current indoor ambient humidity and a current temperature of the indoor heat exchanger coil; obtaining a current moisture content and a current dew point temperature, according to the current indoor ambient temperature and the current indoor ambient humidity; judging a magnitude relation between the set temperature and the current indoor ambient temperature, and judging a magnitude relation between the set moisture content and the current moisture content; controlling temperature and humidity with the air conditioner, according to judging results, the current dew point temperature and the current temperature of the indoor heat exchanger coil.

Specifically, controlling temperature and humidity with the air conditioner, according to judging results, the current dew point temperature and the current temperature of the indoor heat exchanger coil, includes: controlling the air conditioner to perform cooling and dehumidification, if the set temperature is lower than or equal to the current indoor ambient temperature and the set moisture content is lower than or equal to the current moisture content; controlling the air conditioner to perform cooling and humidity retaining, if the set temperature is lower than or equal to the current indoor ambient temperature and the set moisture content is greater than the current moisture content; controlling the air conditioner to perform temperature retaining and dehumidification, if the set temperature is higher than the current indoor ambient temperature and the set moisture content is lower than or equal to the current moisture content; controlling the air conditioner to perform temperature retaining and humidity retaining, if the set temperature is higher than the current indoor ambient temperature and the set moisture content is greater than the current moisture content.

Where, before controlling temperature and humidity with the air conditioner is performed, the compressor of the air conditioner can be controlled to operate with rules set according to the current indoor ambient temperature and the set temperature.

Where, controlling the air conditioner to perform cooling and dehumidification, includes: controlling the compressor to operate at an upper limiting frequency, and judging whether the current temperature of the indoor heat exchanger coil is higher than the current dew point temperature when the compressor is operating at the upper limiting frequency; controlling an opening degree of a dehumidification valve of the air conditioner to decrease by a first preset opening degree, or controlling a rotational speed of an indoor fan of the air conditioner to decrease to a minimum rotational speed, if the current temperature of the indoor heat exchanger coil is higher than the current dew point temperature; controlling the air conditioner to maintain a current operational state, if the current temperature of the indoor heat exchanger coil is lower than or equal to the current dew point temperature. Controlling the air conditioner to perform cooling and humidity retaining, includes: judging whether the current temperature of the indoor heat exchanger coil is higher than the current dew point temperature; controlling the air conditioner to maintain a current operational state, if the current temperature of the indoor heat exchanger coil is higher than the current dew point temperature; controlling an opening degree of a dehumidification valve of the air conditioner to increase by a first preset opening degree, or controlling a rotational speed of an indoor fan of the air conditioner to increase by a first preset percentage, if the current temperature of the indoor heat exchanger coil is lower than or equal to the current dew point temperature. Controlling the air conditioner to perform temperature retaining and dehumidification, includes: controlling the compressor to operate at a lower limit frequency, and controlling a rotational speed of the indoor fan to decrease to a minimum rotational speed; judging whether the current temperature of the indoor heat exchanger coil is higher than the current dew point temperature, when the compressor is operating at the lower limit frequency and a rotational speed of the indoor fan is decreased to the minimum rotational speed; controlling an opening degree of a dehumidification valve of the air conditioner to decrease by a first preset opening degree, if the current temperature of the indoor heat exchanger coil is higher than the current dew point temperature; controlling the air conditioner to maintain a current operational state, if the current temperature of the indoor heat exchanger coil is lower than or equal to the current dew point temperature. Controlling the air conditioner to perform temperature retaining and humidity retaining, includes: controlling the compressor to stop.

In order to realize the above objectives, according to a second aspect of the present disclosure, there is provided a computer readable storage medium having instructions stored thereon, when the instructions are executed by a processor, the air conditioner implements the controlling method as described according to the first aspect of the present disclosure.

The computer readable storage medium according to an embodiment of the present disclosure, can enable an air conditioner to sufficiently satisfy a user's requirement for a comfortable humidity level.

In order to realize the above objectives, an apparatus for controlling an air conditioner is provided according to a third aspect of the present disclosure, where the apparatus includes: a first acquisition module, for obtaining an initial indoor ambient temperature and an initial indoor ambient humidity, when an air conditioner is turned on; a second acquisition module, for obtaining an initial dew point temperature, according to the initial indoor ambient temperature and the initial indoor ambient humidity; a control module, for controlling a temperature of an indoor heat exchanger coil of the air conditioner to be equal to the initial dew point temperature, and maintaining a current operating frequency of a compressor of the air conditioner unchanged; the first acquisition module is also configured to obtain a current indoor ambient temperature; the control module is also configured to judge whether the current indoor ambient temperature is lower than or equal to a set temperature; the first acquisition module is also configured to obtain a current indoor ambient humidity if the current indoor ambient temperature is lower than or equal to the set temperature; the second acquisition module is also configured to obtain a current moisture content and a current dew point temperature, according to the current indoor ambient temperature and the current indoor ambient humidity; the control module is also configured to control the air conditioner to perform humidification or dehumidification according to the temperature of the indoor heat exchanger coil, the current moisture content and the current dew point temperature.

For the apparatus for controlling an air conditioner according to an embodiment of the present disclosure, when an air conditioner is turned on, an initial dew point temperature may be obtained by the second acquisition module according to an initial ambient condition, and a temperature of the indoor heat exchanger coil of the air conditioner may be maintained at an initial dew point temperature by the control module, in order to prevent the air conditioner from performing dehumidification during a cooling control process. After an indoor temperature reaches a set temperature of the air conditioner, the air conditioner can be controlled to perform humidification or dehumidification by the control module according to a temperature of the indoor heat exchanger coil, a current moisture content and a current dew point temperature. Therefore, a user's requirement for comfortable humidity can be sufficiently satisfied, and effective control of humidity can be achieved without a need for additional humidity sensor, but only with a need for basic parts of the air conditioner, such that cost can also be reduced.

The apparatus for controlling an air conditioner according to the embodiment described above, may also include additional technical features as follows:

The control module is also configured to judge, when the current indoor ambient temperature is higher than the set temperature, whether the indoor ambient temperature remains unchanged within a first preset time, and control, if the indoor ambient temperature remains unchanged within the first preset time, to decrease the temperature of the indoor heat exchanger coil.

Specifically the control module is configured to judge the current moisture content, and judge a magnitude relation between the temperature of the indoor heat exchanger coil and the current dew point temperature; where, the control module is configured to control to decrease a rotational speed of an indoor fan of the air conditioner for dehumidification, if the current moisture content is greater than a first preset value and the temperature of the indoor heat exchanger coil is higher than the current dew point temperature; the control module is configured to control to increase a rotational speed of the indoor fan of the air conditioner for humidification, if the current moisture content is lower than a second preset value and the temperature of the indoor heat exchanger coil is lower than the current dew point temperature, where the second preset value is lower than the first preset value.

According to an embodiment of the present disclosure, the first preset value is a moisture content corresponding to a temperature of 26° C. and a humidity of 60%, the second preset value is a moisture content corresponding to a temperature of 26° C. and a humidity of 40%.

According to an embodiment of the present disclosure, the apparatus for controlling an air conditioner further includes: a third acquisition module for obtaining the set temperature and the set humidity, when the air conditioner is in cooling operation; the second acquisition module is also configured to obtain a set moisture content, according to the set temperature and the set humidity; the first acquisition module is also configured to obtain a current temperature of the indoor heat exchanger coil; the control module is also configured to judge a magnitude relation between the set temperature and the current indoor ambient temperature, judge a magnitude relation between the set moisture content and the current moisture content, and control temperature and humidity with the air conditioner, according to judging results, the current dew point temperature and the current temperature of the indoor heat exchanger coil.

Specifically, the control module is configured to control the air conditioner to perform cooling and dehumidification, if the set temperature is lower than or equal to the current indoor ambient temperature and the set moisture content is lower than or equal to the current moisture content; control the air conditioner to perform cooling and humidity retaining, if the set temperature is lower than or equal to the current indoor ambient temperature and the set moisture content is greater than the current moisture content; control the air conditioner to perform temperature retaining and dehumidification, if the set temperature is higher than the current indoor ambient temperature and the set moisture content is lower than or equal to the current moisture content; and control the air conditioner to perform temperature retaining and humidity retaining, if the set temperature is higher than the current indoor ambient temperature and the set moisture content is greater than the current moisture content.

Where, before controlling temperature and humidity with the air conditioner, the control module is configured to control the compressor of the air conditioner to operate with rules set according to the current indoor ambient temperature and the set temperature.

Where, the control module is configured to control the air conditioner to perform cooling and dehumidification by executing following steps: controlling the compressor to operate at an upper limiting frequency, and judging whether the current temperature of the indoor heat exchanger coil is higher than the current dew point temperature when the compressor is operating at the upper limiting frequency; controlling an opening degree of a dehumidification valve of the air conditioner to decrease by a first preset opening degree, or controlling a rotational speed of an indoor fan of the air conditioner to decrease to a minimum rotational speed, if the current temperature of the indoor heat exchanger coil is higher than the current dew point temperature; controlling the air conditioner to maintain a current operational state, if the current temperature of the indoor heat exchanger coil is lower than or equal to the current dew point temperature. The control module is configured to control the air conditioner to perform cooling and humidity retaining by executing following steps: judging whether the current temperature of the indoor heat exchanger coil is higher than the current dew point temperature; controlling the air conditioner to maintain a current operational state, if the current temperature of the indoor heat exchanger coil is higher than the current dew point temperature; controlling an opening degree of a dehumidification valve of the air conditioner to increase by a first preset opening degree, or controlling a rotational speed of an indoor fan of the air conditioner to increase by a first preset percentage, if the current temperature of the indoor heat exchanger coil is lower than or equal to the current dew point temperature. The control module is configured to control the air conditioner to perform temperature retaining and dehumidification by executing following steps: controlling the compressor to operate at a lower limit frequency, and controlling a rotational speed of the indoor fan to decrease to a minimum rotational speed; judging whether the current temperature of the indoor heat exchanger coil is higher than the current dew point temperature, when the compressor is operating at the lower limit frequency and a rotational speed of the indoor fan is decreased to the minimum rotational speed; controlling an opening degree of a dehumidification valve of the air conditioner to decrease by a first preset opening degree, if the current temperature of the indoor heat exchanger coil is higher than the current dew point temperature; controlling the air conditioner to maintain a current operational state, if the current temperature of the indoor heat exchanger coil is lower than or equal to the current dew point temperature. The control module is configured to control the air conditioner to perform temperature retaining and humidity retaining by executing following steps: controlling the compressor to stop.

In order to realize the above objectives, an air conditioner is provided according to a fourth aspect of the present disclosure, where the air conditioner includes the apparatus for controlling an air conditioner according to the third aspect of the present disclosure.

The air conditioner according to an embodiment of the present disclosure, can sufficiently satisfy a user's requirement for a comfortable humidity level

DETAILED DESCRIPTION

Figure 1:
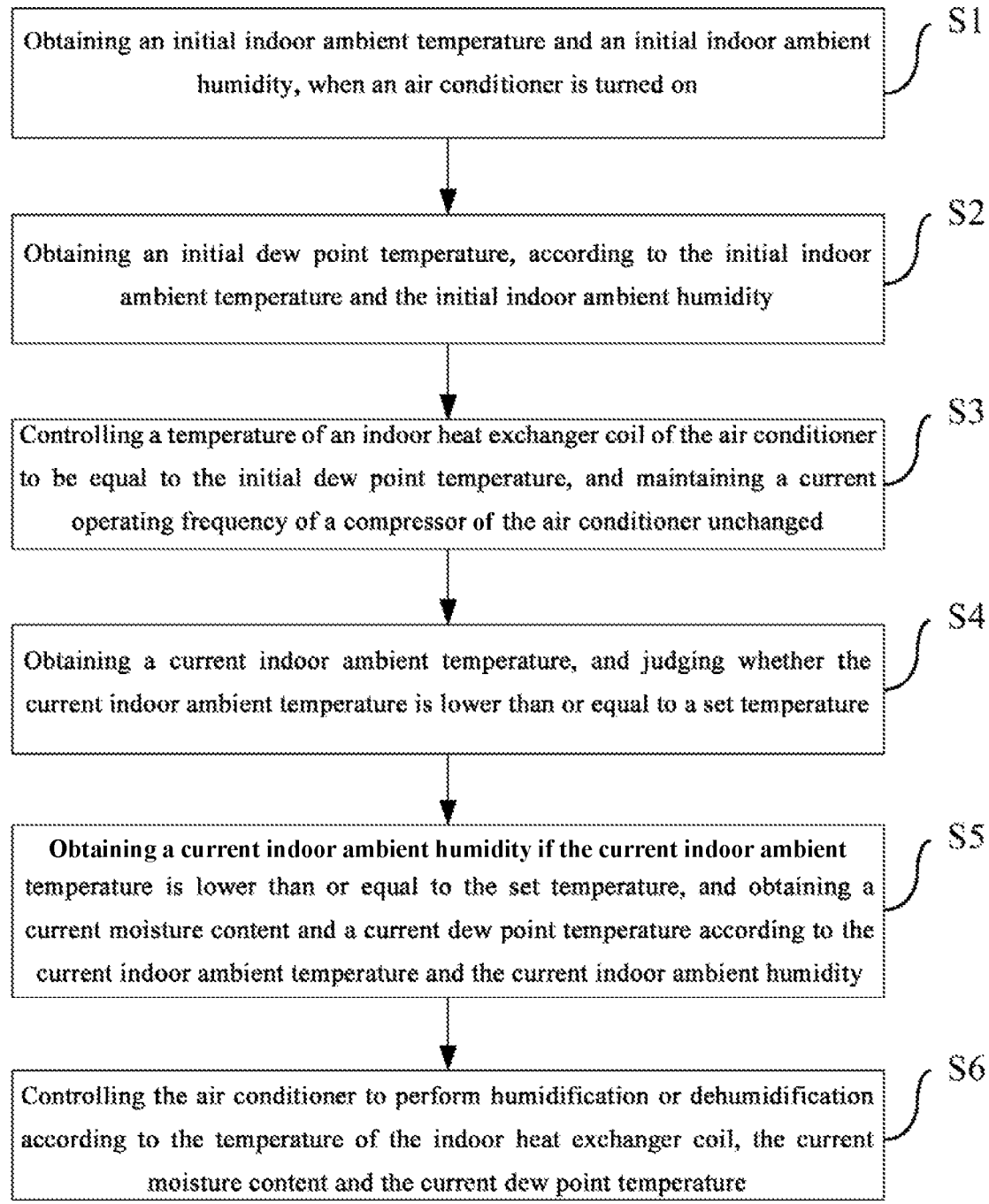
FIG. 1 is a block diagram illustrating a flow chart of a method for controlling an air conditioner according to several embodiments of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are exemplary, which are used to explain the present disclosure, and shall not be construed to limit the present disclosure.

An air conditioner, a method and an apparatus for controlling the same, according to embodiments of the present disclosure, will be described below with reference to the drawings.

FIG. 1 is a block diagram illustrating a flow chart of a method for controlling an air conditioner according to an embodiment of the present disclosure.

As shown in FIG. 1, a method for controlling an air conditioner, according to an embodiment of the present disclosure, includes following steps:

S1, obtaining an initial indoor ambient temperature and an initial indoor ambient humidity, when an air conditioner is turned on.

Where, an initial indoor ambient temperature and an initial indoor ambient humidity refer to an indoor temperature and an indoor humidity when the air conditioner is turned on but has not yet affected the indoor temperature and the indoor humidity. An initial indoor ambient temperature and an initial indoor ambient humidity may be detected by an indoor ambient temperature sensor and an indoor humidity sensor, respectively, of the air conditioner when the air conditioner is turned on.

S2, obtaining an initial dew point temperature, according to the initial indoor ambient temperature and the initial indoor ambient humidity.

In an embodiment of the present disclosure, a correspondence between temperature, humidity and dew point temperature may be obtained in advance, and the correspondence may be recorded and stored in a form of a table. Therefore, after obtaining the initial indoor ambient temperature and the initial indoor ambient humidity, the initial dew point temperature may be obtained by looking up in the table.

In a specific embodiment of the present disclosure, the correspondence between temperature, humidity and dew point temperature may be shown in Table 1:

TABLE 1

| Dew point temperature | | Temperature (° C.) | | | | |
|---|---|---|---|---|---|---|
| (° C.) | | T1 | T2 | T3 | ... | Tn |
| Humidity (% rh) | Φ1 | TL11 | TL12 | TL13 | ... | TL1n |
| | Φ2 | TL21 | TL22 | TL23 | ... | TL2n |
| | Φ3 | TL31 | TL32 | TL33 | ... | TL3n |
| | ... | ... | ... | ... | ... | ... |
| | Φm | TLm1 | TLm2 | TLm3 | ... | TLmn |

Where, T1, T2, T3, ... Tn represent temperature, Φ1, Φ2, Φ3, ..., Φm represent humidity, TL11, TL12, TL13, ..., TLmn represent dew point temperature, where a size of m and n determines an amount of data for the above correspondence.

S3, controlling a temperature of an indoor heat exchanger coil of the air conditioner to be equal to the initial dew point temperature, and maintaining a current operating frequency of a compressor of the air conditioner unchanged.

In an embodiment of the present disclosure, a temperature of the indoor heat exchanger coil may be controlled to increase or decrease by adjusting an operating frequency of the compressor when the air conditioner is operating, so that the indoor heat exchanger coil temperature reaches the initial dew point temperature. When a temperature of the indoor heat exchanger coil reaches the initial dew point temperature, the current operating frequency of the compressor may be maintained unchanged.

Therefore, it is possible to prevent dehumidification due to a low temperature of the indoor heat exchanger coil during a cooling process of the air conditioner, and prevent indoor air from being dry.

S4, obtaining a current indoor ambient temperature, and judging whether the current indoor ambient temperature is lower than or equal to a set temperature.

A set temperature is a target temperature set by a user for the air conditioner. If the user does not set a temperature after power on, a target temperature for the air conditioner set before a previous shutdown may be used as the set temperature.

While the current operating frequency of the compressor of the air conditioner is maintained unchanged, the current indoor ambient temperature may be obtained through an indoor ambient temperature sensor and compared with the set temperature.

When the current indoor ambient temperature is higher than the set temperature, it may be further judged whether the indoor ambient temperature remains unchanged within a first preset time, and if the indoor ambient temperature remains unchanged within the first preset time, the temperature of the indoor heat exchanger coil may be controlled to decrease. In other words, when the indoor ambient temperature does not reach the set temperature, the temperature of the indoor heat exchanger coil can be appropriately controlled to decrease for cooling.

S5, obtaining a current indoor ambient humidity if the current indoor ambient temperature is lower than or equal to the set temperature, and obtaining a current moisture content and a current dew point temperature according to the current indoor ambient temperature and the current indoor ambient humidity.

When the current indoor ambient temperature is lower than or equal to the set temperature, a temperature regulation by the air conditioner has been completed, and then humidification or dehumidification can be performed according to an indoor humidity status.

The current indoor ambient humidity may be obtained through an indoor ambient humidity sensor, and the current dew point temperature may be obtained by looking up in Table 1.

In an embodiment of the present disclosure, a correspondence between temperature, humidity and moisture content may be obtained in advance, and the correspondence may be recorded and stored in a form of a table. Therefore, after obtaining the current indoor ambient temperature and the current indoor ambient humidity, a current moisture content may be obtained by looking up in the table.

In a specific embodiment of the present disclosure, the correspondence between temperature, humidity and moisture content may be shown in Table 2:

TABLE 2

| Moisture content | | Indoor temperature (° C.) | | | |
|---|---|---|---|---|---|
| (g/kg) | | T1 | T2 | T3 | ... Tn |
| Humidity (% rh) | Φ1 | dL11 | dL12 | dL13 | ... dL1n |
| | Φ2 | dL21 | dL22 | dL23 | ... dL2n |
| | Φ3 | dL31 | dL32 | dL33 | ... dL3n |
| | ... | ... | ... | ... | ... |
| | Φm | dLm1 | dLm2 | dLm3 | ... dLmn |

Where, T1, T2, T3, ... Tn represent temperature; Φ1, Φ2, Φ3, ..., Φm represent humidity; dL11, dL12, dL13, ..., dLmn represent moisture content; where a size of m and n determines an amount of data for the above correspondence.

S6, controlling the air conditioner to perform humidification or dehumidification according to the temperature of the indoor heat exchanger coil, the current moisture content and the current dew point temperature.

Specifically, for example, the current moisture content may be judged, and a magnitude relation between the temperature of the indoor heat exchanger coil and the current dew point temperature may be judged. A rotational speed of an indoor fan of the air conditioner may be controlled to decrease for dehumidification, if the current moisture content is greater than the first preset value and the temperature of the indoor heat exchanger coil is higher than the current dew point temperature; and a rotational speed of the indoor fan of the air conditioner may be controlled to increase for humidification, if the current moisture content is lower than a second preset value and the temperature of the indoor heat exchanger coil is lower than the current dew point temperature, where the second preset value is lower than the first preset value.

According to an embodiment of the present disclosure, the first preset value is a moisture content corresponding to a temperature of 26° C. and a humidity of 60%, the value of which is 12.79; the second preset value is a moisture content corresponding to a temperature of 26° C. and a humidity of 40%, the value of which is 8.47.

Figure 2:
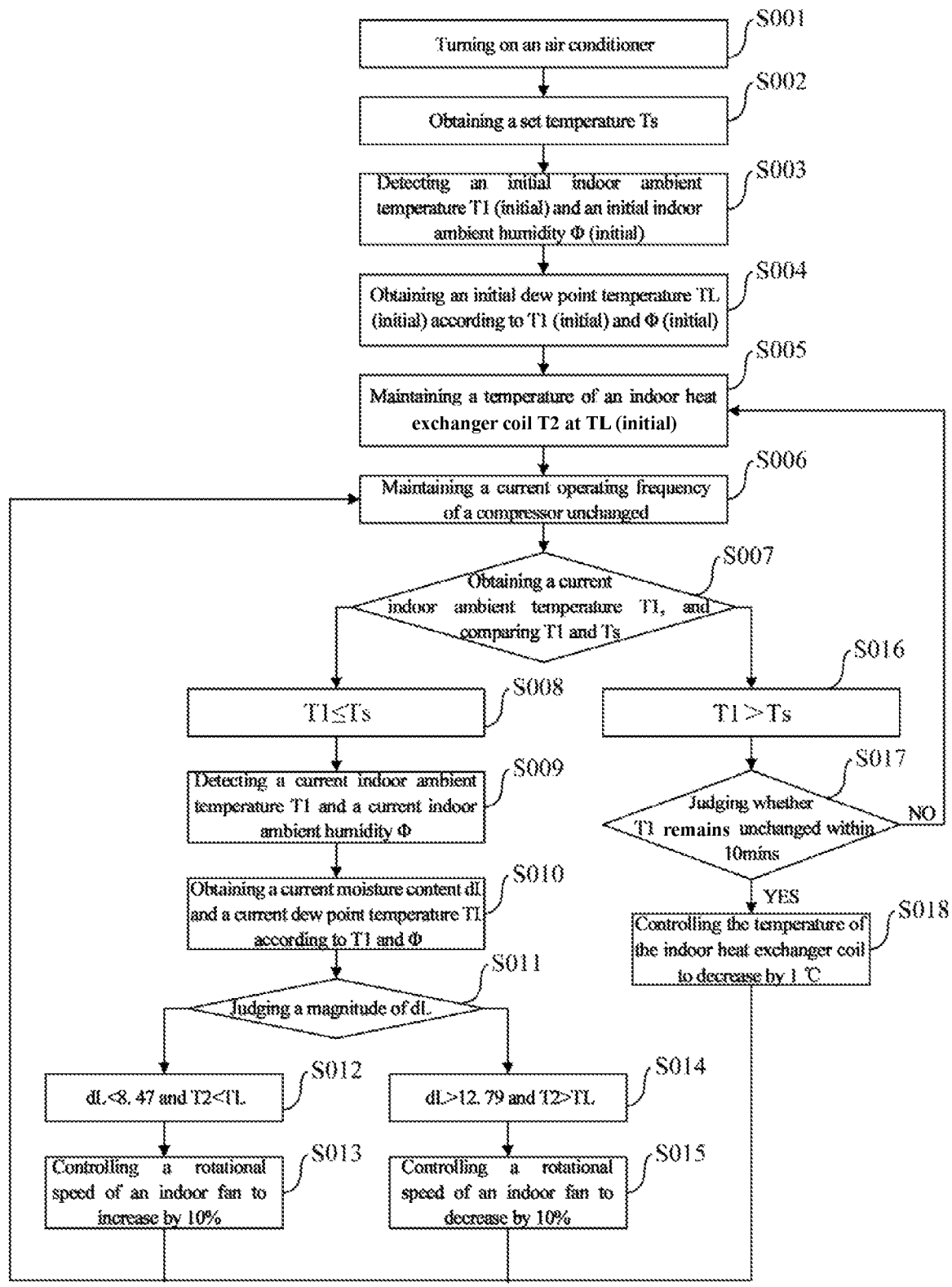
FIG. 2 is a block diagram illustrating a flow chart of a method for controlling an air conditioner according to a specific embodiment of the present disclosure.

As shown in FIG. 2, a method for controlling an air conditioner, according to a specific embodiment of the present disclosure, includes following steps:

S001, turning on an air conditioner.

S002, obtaining a set temperature Ts.

S003, detecting an initial indoor ambient temperature T1 (initial) and an initial indoor ambient humidity Φ (initial).

S004, obtaining an initial dew point temperature TL (initial) according to T1 (initial) and Φ (initial).

S005, maintaining a temperature of an indoor heat exchanger coil T2 at TL (initial).

S006, maintaining a current operating frequency of a compressor unchanged.

S007, obtaining a current indoor ambient temperature T1, and comparing T1 and Ts. Comparison results are in S008 and S016.

S008, T1≤Ts.

S009, detecting a current indoor ambient temperature T1 and a current indoor ambient humidity Φ.

S010, obtaining a current moisture content dL and a current dew point temperature TL according to T1 and Φ. Besides obtaining the current moisture content dL, the initial dew point temperature TL (initial) and the current dew point temperature TL by Table 1 and Table 2 in the above embodiment, a relational expression between temperature, humidity and moisture content and a relational expression between temperature, humidity and dew point temperature may be fitted through a large number of experiments. Then, the initial dew point temperature TL (initial) may be calculated according to T1 (initial), Φ (initial) and above relational expression, and the current moisture content dL and current dew point temperature TL may be calculated according to T1, Φ and the above relational expression.

S011, judging a magnitude of dL, and comparing T2 and TL. Judging and comparison results are in S012 and S014.

S012, dL<8.47 and T2<TL.

S013, controlling a rotational speed of an indoor fan to increase by 10%.

S014, dL>12.79 and T2>TL.

S015, controlling a rotational speed of an indoor fan to decrease by 10%.

S016, T1>Ts.

S017, judging whether T1 remains unchanged within 10 mins. If true, executing step S018; if false, returning to step S005.

S018, controlling the temperature of the indoor heat exchanger coil to decrease by 1° C.

The method may return to step S006 after steps S013, S015 and S018.

For the method for controlling an air conditioner according to an embodiment of the present disclosure, when the air conditioner is turned on, the initial dew point temperature may be obtained according to the initial ambient condition, and the temperature of the indoor heat exchanger coil of the air conditioner may be maintained at the initial dew point temperature, in order to prevent the air conditioner from performing dehumidification during a cooling control process. After the indoor temperature reaches the set temperature of the air conditioner, the air conditioner can be controlled to perform humidification or dehumidification according to the temperature of the indoor heat exchanger coil, the current moisture content and the current dew point temperature. Therefore, a user's requirement for comfortable humidity can be sufficiently satisfied, and effective control of humidity can be achieved without a need for additional humidity sensor, but only with a need for basic parts of the air conditioner, such that cost can also be reduced.

It should be understood that during a cooling operation of the air conditioner, an operation control rule is generally to give priority to indoor temperature control. Even when indoor humidity is relatively low, it is possible that the compressor is still operating at a high frequency, which will undoubtedly cause the air to be drier. However, when indoor humidity is relatively high, it is possible that the compressor is still operating at a low frequency, which is not possible for effective dehumidification, causing the air to be cold and humid, and affecting a human body's comfort. In order to meet a user's requirement for a comfortable sensation to temperature and humidity at the same time, there is also provided in the present disclosure a method for controlling temperature and humidity with the air conditioner during a cooling operation of the air conditioner.

Figure 3:
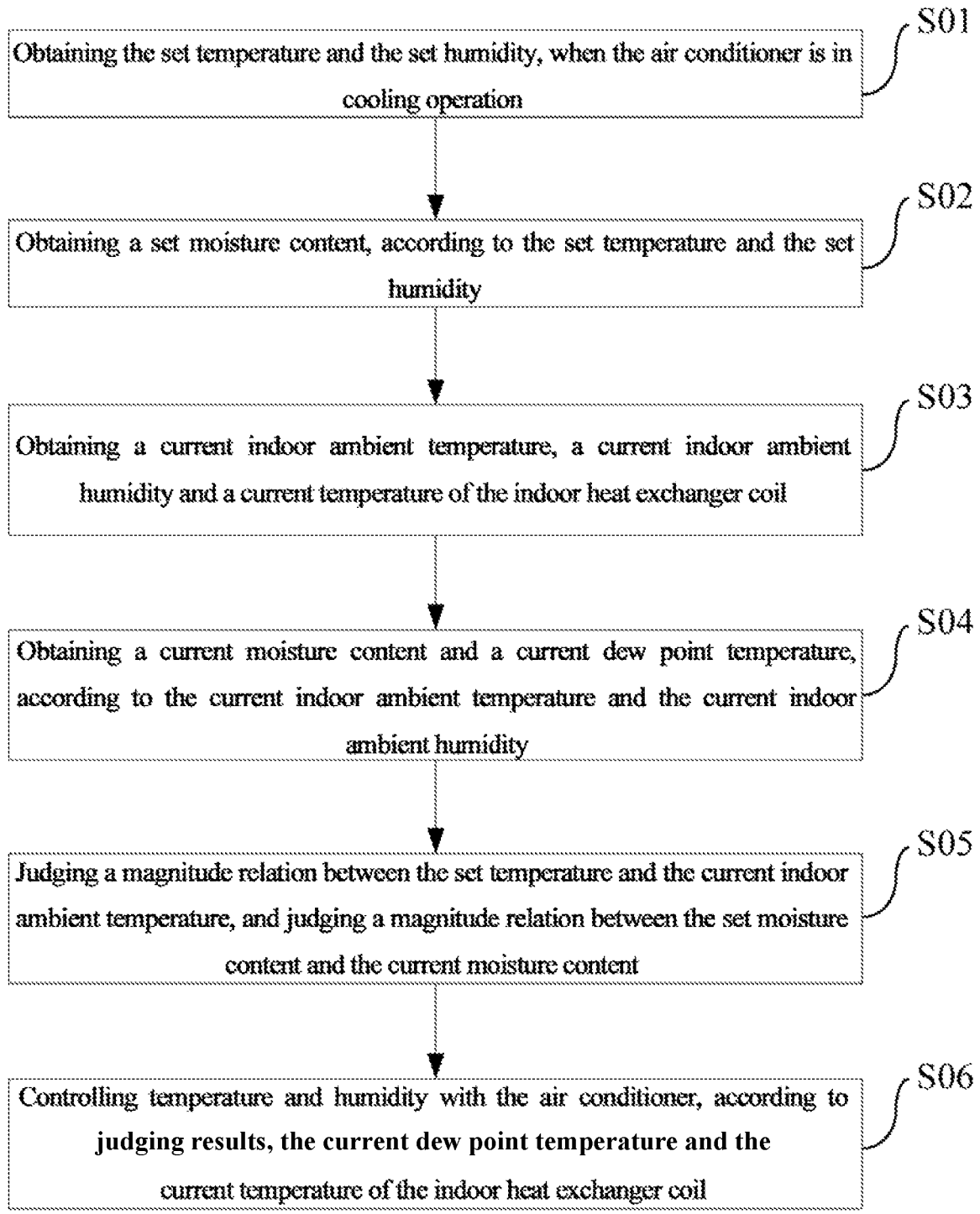
FIG. 3 is a block diagram illustrating a flow chart of a method for controlling an air conditioner according to an embodiment of the present disclosure.

As shown in FIG. 3, a method for controlling an air conditioner, according to an embodiment of the present disclosure, includes following steps:

S01, obtaining the set temperature and the set humidity, when the air conditioner is in cooling operation.

When the air conditioner is turned on, a user may set parameters for the air conditioner. A set temperature, that is, a target temperature for an operation of the air conditioner, and a set humidity, that is, a target humidity for an operation of the air conditioner, etc. are input with a remote control, etc., such that the air conditioner may perform temperature and humidity regulation according to the set target temperature and target humidity. If a user does not set a temperature and a humidity for a current operation, a set temperature and a set humidity for the air conditioner set before a previous shutdown may be used as the set temperature and the set humidity for a current operation.

S02, obtaining a set moisture content, according to the set temperature and the set humidity.

In an embodiment of the present disclosure, a correspondence between temperature, humidity and moisture content may be obtained in advance, and the correspondence may be recorded and stored in a form of a table. Therefore, after obtaining the set temperature and the set humidity, the set moisture content may be obtained by looking up in the table.

In a specific embodiment of the present disclosure, the correspondence between temperature, humidity and moisture content may be shown in Table 2.

S03, obtaining a current indoor ambient temperature, a current indoor ambient humidity and a current temperature of the indoor heat exchanger coil.

The air conditioner according to an embodiment of the present disclosure may include an indoor ambient temperature sensor, an indoor ambient humidity sensor, and an indoor heat exchanger coil temperature sensor arranged for the indoor heat exchanger coil, so as to detect the current indoor ambient temperature, the current indoor ambient humidity and the current temperature of the indoor heat exchanger coil, respectively.

S04, obtaining a current moisture content and a current dew point temperature, according to the current indoor ambient temperature and the current indoor ambient humidity.

Likely, the current moisture content may be obtained by looking up in Table 2 with the current indoor ambient temperature and the current indoor ambient humidity.

In an embodiment of the present disclosure, a correspondence between temperature, humidity and dew point temperature may be obtained in advance, and the correspondence may be recorded and stored in a form of a table. Therefore, after obtaining the current indoor ambient temperature and the current indoor ambient humidity, the current dew point temperature may be obtained by looking up in the table.

In a specific embodiment of the present disclosure, the correspondence between temperature, humidity and dew point temperature may be shown in Table 1.

S05, judging a magnitude relation between the set temperature and the current indoor ambient temperature, and judging a magnitude relation between the set moisture content and the current moisture content.

S06, controlling temperature and humidity with the air conditioner, according to judging results, the current dew point temperature and the current temperature of the indoor heat exchanger coil.

Specifically, the air conditioner is controlled to perform cooling and dehumidification, if the set temperature is lower than or equal to the current indoor ambient temperature and the set moisture content is lower than or equal to the current moisture content; the air conditioner is controlled to perform cooling and humidity retaining, if the set temperature is lower than or equal to the current indoor ambient temperature and the set moisture content is greater than the current moisture content; the air conditioner is controlled to perform temperature retaining and dehumidification, if the set temperature is higher than the current indoor ambient temperature and the set moisture content is lower than or equal to the current moisture content; the air conditioner is controlled to perform temperature retaining and humidity retaining, if the set temperature is higher than the current indoor ambient temperature and the set moisture content is greater than the current moisture content.

Where, before controlling temperature and humidity with the air conditioner is performed, the compressor of the air conditioner is controlled to operate with rules set according to the current indoor ambient temperature and the set temperature. That is to control an operation of the compressor with a goal of regulating the current indoor ambient temperature to the set temperature. If the current indoor ambient temperature is high relative to the set temperature, an operating frequency of the compressor is controlled to increase. If the current indoor ambient temperature is close to or just exceeds the set temperature, an operating frequency of the compressor is controlled to decrease.

The air conditioner according to an embodiment of the present disclosure may or may not include a dehumidification valve.

If the air conditioner includes a dehumidification valve, the air conditioner may be enabled to perform dehumidification, by controlling the dehumidification valve to perform throttling operation, and by controlling a throttling element to be at a fully open state.

Specifically, the air conditioner may include a compressor, an outdoor heat exchanger, a throttling element, and an indoor heat exchanger connected in sequence, and an indoor fan correspondingly arranged on the indoor heat exchanger, where a refrigerant piping of the indoor heat exchanger includes two parts, two ends of a part of the refrigerant piping are directly connected to the throttle element and the compressor. An end of another part of the refrigerant piping is connected to the throttling element through a dehumidification valve, and another end is connected to the compressor. Where, the dehumidification valve and the throttling element may be both electronic expansion valves.

A dehumidification device may be activated, by controlling the throttling element in above structure to be at a fully open state, and by controlling the dehumidification valve to perform throttling operation. Now high-temperature and high-pressure gaseous state refrigerant from the compressor transform into high-temperature and high-pressure liquid state refrigerant after heat exchange through the outdoor heat exchanger, then part of the high-temperature and high-pressure liquid state refrigerant directly enter a part of the refrigerant piping of the indoor heat exchanger for heat exchange, after that, transforming into low-temperature and low-pressure liquid state refrigerant and flowing back to the compressor. Another part of high-temperature and high-pressure liquid state refrigerant transform into low-temperature and low-pressure liquid state refrigerant by throttling of the dehumidification valve, then flow back to the compressor after heat exchange through another part of the refrigerant piping of the indoor heat exchanger. Where, a part of the refrigerant piping of the indoor heat exchanger acts as a condenser to perform heating in an indoor space, another part of the refrigerant piping acts as an evaporator to perform substantial dehumidification in an indoor space, and thus realizing isothermal dehumidification in an indoor space to ensure comfortable indoor humidity.

It should be understood that when an opening degree of the dehumidification valve decreases, a capacity of dehumidification increases; when an opening degree of the dehumidification valve increases, a capacity of dehumidification decreases; when there's no need to activate the dehumidification device, the dehumidification valve may be controlled to be at a fully open state, and the throttling element may be controlled to perform throttling operation, i.e., to restore a normal operational state.

If the air conditioner does not include a dehumidification valve, a rotational speed of the indoor fan may be controlled to decrease for dehumidification.

Temperature control may be realized by adjusting an operating frequency of the compressor.

According to above manners for dehumidification and temperature control, according to an embodiment of the present disclosure, controlling the air conditioner to perform cooling and dehumidification, includes: controlling the compressor to operate at an upper limiting frequency, and judging whether a current temperature of the indoor heat exchanger coil is higher than a current dew point temperature when the compressor is operating at the upper limiting frequency; controlling an opening degree of the dehumidification valve of the air conditioner to decrease by a first preset opening degree, or controlling a rotational speed of an indoor fan of the air conditioner to decrease to a minimum rotational speed, if the current temperature of the indoor heat exchanger coil is higher than the current dew point temperature; controlling the air conditioner to maintain a current operational state, if the current temperature of the indoor heat exchanger coil is lower than or equal to the current dew point temperature.

According to an embodiment of the present disclosure, controlling the air conditioner to perform cooling and humidity retaining, includes: judging whether a current temperature of the indoor heat exchanger coil is higher than a current dew point temperature; controlling the air conditioner to maintain a current operational state, if the current temperature of the indoor heat exchanger coil is higher than the current dew point temperature; controlling an opening degree of a dehumidification valve of the air conditioner to increase by a first preset opening degree, or controlling a rotational speed of an indoor fan of the air conditioner to increase by a first preset percentage, if the current temperature of the indoor heat exchanger coil is lower than or equal to the current dew point temperature.

According to an embodiment of the present disclosure, controlling the air conditioner to perform temperature retaining and dehumidification, includes: controlling the compressor to operate at a lower limit frequency, and controlling a rotational speed of the indoor fan to decrease to a minimum rotational speed; judging whether a current temperature of the indoor heat exchanger coil is higher than a current dew point temperature, when the compressor is operating at the lower limit frequency and a rotational speed of the indoor fan is decreased to the minimum rotational speed; controlling an opening degree of a dehumidification valve of the air conditioner to decrease by a first preset opening degree, if the current temperature of the indoor heat exchanger coil is higher than the current dew point temperature; controlling the air conditioner to maintain a current operational state, if the current temperature of the indoor heat exchanger coil is lower than or equal to the current dew point temperature.

According to an embodiment of the present disclosure, controlling the air conditioner to perform temperature retaining and humidity retaining, includes: controlling the compressor to stop.

Figure 4:
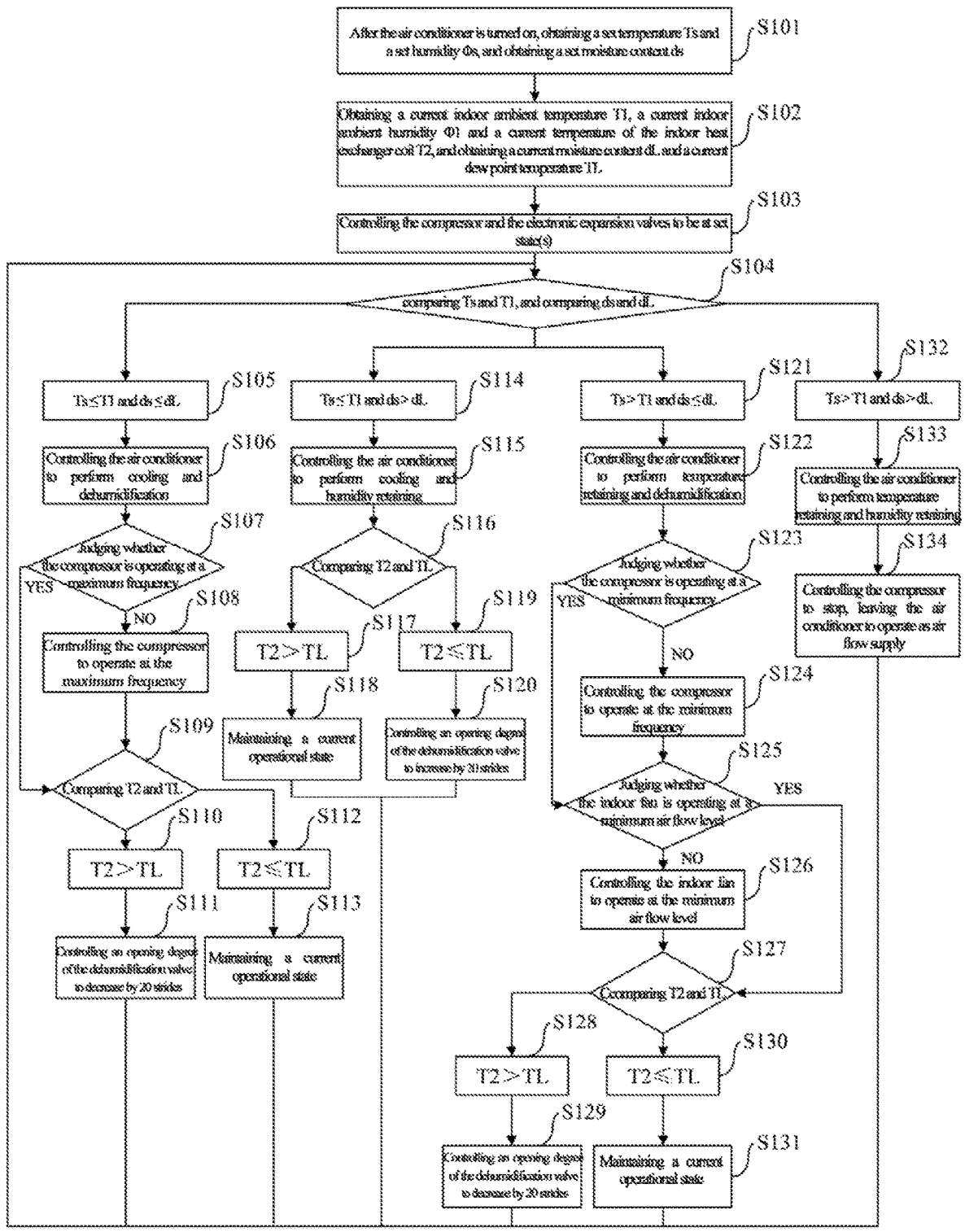
FIG. 4 is a block diagram illustrating a flow chart of a method for controlling an air conditioner according to another embodiment of the present disclosure.

In a specific embodiment of the present disclosure, if the air conditioner includes a dehumidification valve, as shown in FIG. 4, a method for controlling the air conditioner may include following steps:

S101, after the air conditioner is turned on, obtaining a set temperature Ts and a set humidity $\Phi s$, and obtaining a set moisture content ds.

S102, obtaining a current indoor ambient temperature T1, a current indoor ambient humidity $\Phi 1$ and a current temperature of the indoor heat exchanger coil T2, and obtaining a current moisture content dL and a current dew point temperature TL. Besides obtaining ds, dL and TL by looking up in Table 1 and Table 2 in above embodiments, a relational expression between temperature, humidity and moisture content and a relational expression between temperature, humidity and dew point temperature may be fitted through a large number of experiments. Then, ds, dL and TL may be calculated according to Ts, $\Phi s$, T1, $\Phi 1$ and above two relational expressions.

S103, controlling the compressor and the electronic expansion valves to be at set state(s). Set state(s) refer to, operational rules of the compressor which are set according to a current indoor ambient temperature and the set temperature, and switching states of the electronic expansion valves.

S104, comparing Ts and T1, and comparing ds and dL. Comparison results are in S105, S114, S121 and S132.

S105, if Ts≤T1 and ds≤dL:

S106, controlling the air conditioner to perform cooling and dehumidification. If Ts≤T1, there's still a need to decrease an indoor ambient temperature; if ds≤dL, that means an indoor humidity is relatively high, there's a need for dehumidification.

S107, judging whether the compressor is operating at a maximum frequency. If true, executing step S109; if false, executing step S109 after executing step S108.

S108, controlling the compressor to operate at the maximum frequency. By controlling the compressor to operate at an upper limiting frequency, cooling can be faster.

S109, comparing T2 and TL. Comparison results are in S110 and S112.

S110, T2>TL.

S111, controlling an opening degree of the dehumidification valve to decrease by 20 strides. If T2>TL, the indoor heat exchanger coil has no dehumidification effect, under this condition, controlling an opening degree of the dehumidification valve to decrease for dehumidification.

S112, T2≤TL.

S113, maintaining a current operational state. If T2≤TL, the indoor heat exchanger coil has dehumidification effect, under this condition, just maintaining a current operational state.

S114, Ts≤T1 and ds>dL.

S115, controlling the air conditioner to perform cooling and humidity retaining. If Ts≤T1, there's still a need to decrease an indoor ambient temperature; if ds>dL, that means an indoor humidity is relatively low, there's no need for dehumidification.

S116, comparing T2 and TL. Comparison results are in S117 and S119.

S117, T2>TL.

S118, maintaining a current operational state. If T2>TL, the indoor heat exchanger coil has no dehumidification effect, under this condition, just maintaining a current operational state.

S119, T2≤TL.

S120, controlling an opening degree of the dehumidification valve to increase by 20 strides. If T2≤TL, the indoor heat exchanger coil has dehumidification effect, under this condition, controlling an opening degree of the dehumidification valve to increase, in order to reduce or stop dehumidification.

S121, Ts>T1 and ds≤dL.

S122, controlling the air conditioner to perform temperature retaining and dehumidification. If Ts>T1, the indoor ambient temperature reaches or lower than the set temperature; if ds≤dL, that means the indoor humidity is relatively high, there's a need for dehumidification.

S123, judging whether the compressor is operating at a minimum frequency, where the minimum frequency is greater than 0. If true, executing step S125; if false, executing step S125 after executing step S124.

S124, controlling the compressor to operate at the minimum frequency. By controlling the compressor to operate at a lower limit frequency, a cooling process will be stop.

S125, judging whether the indoor fan is operating at a minimum air flow level. If true, executing step S127; if false, executing step S127 after executing step S126.

S126, controlling the indoor fan to operate at the minimum air flow level. By controlling the indoor fan to operate at the minimum air flow level, dehumidification can be faster.

S127, comparing T2 and TL. Comparison results are in S128 and S130.

S128, T2>TL.

S129, controlling an opening degree of the dehumidification valve to decrease by 20 strides. If T2>TL, the indoor heat exchanger coil has no dehumidification effect, under this condition, controlling an opening degree of the dehumidification valve to decrease for dehumidification.

S130, T2≤TL.

S131, maintaining a current operational state. If T2≤TL, the indoor heat exchanger coil has dehumidification effect, under this condition, just maintaining a current operational state.

S132, Ts>T1 and ds>dL.

S133, controlling the air conditioner to perform temperature retaining and humidity retaining. If Ts>T1, that means the indoor ambient temperature reaches or lower than the set temperature; if ds>dL, that means an indoor humidity is relatively low, there's no need for dehumidification.

S134, controlling the compressor to stop, leaving the air conditioner to operate as air flow supply.

The method may return to step S104 after steps S111, S113, S118, S120, S129, S131 and S134, as a circulation for temperature and humidity control.

Figure 5:
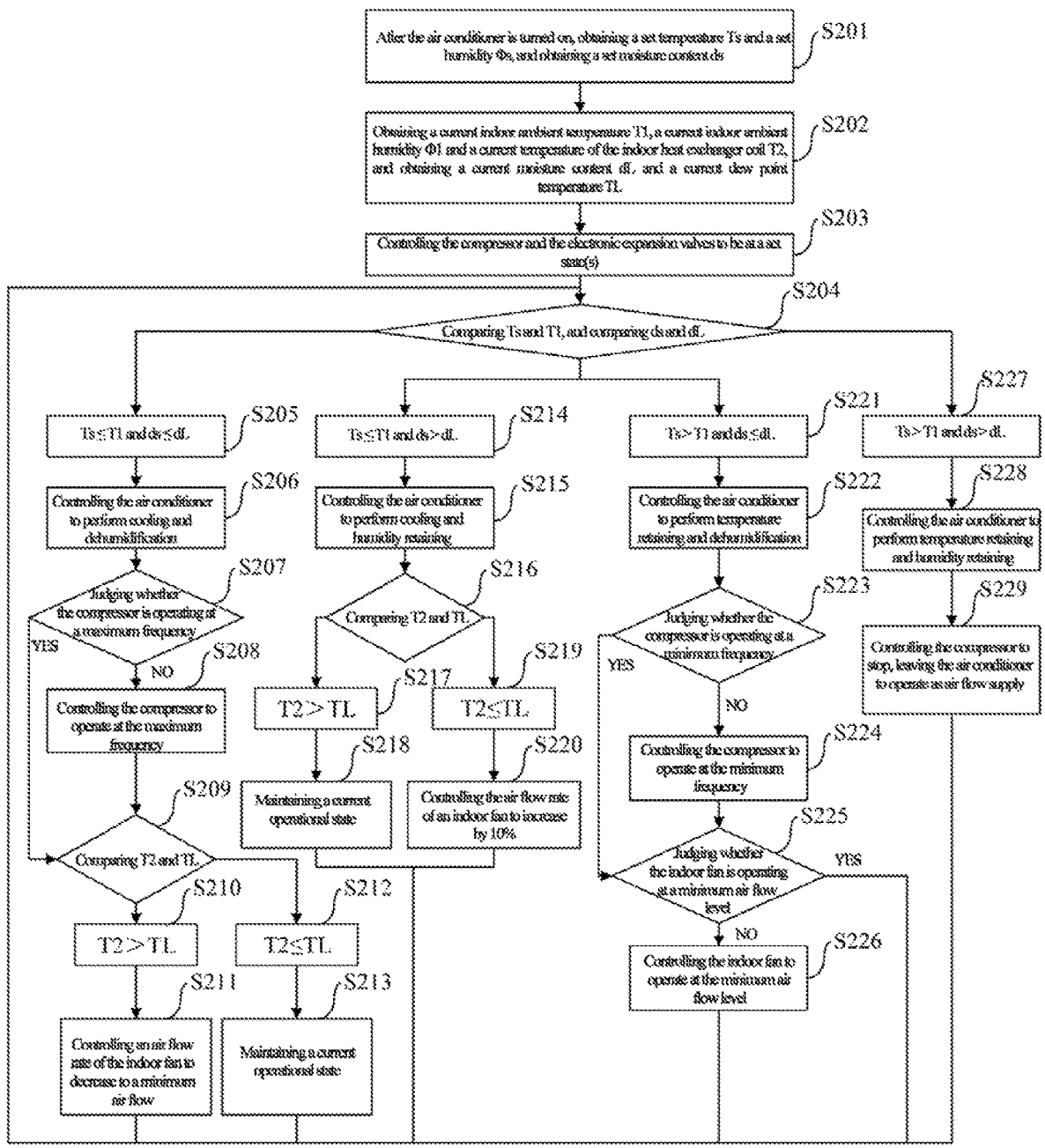
FIG. 5 is a block diagram illustrating a flow chart of a method for controlling an air conditioner according to yet another embodiment of the present disclosure.

In a specific embodiment of the present disclosure, if the air conditioner does not include a dehumidification valve, as shown in FIG. 5, a method for controlling the air conditioner may include following steps:

S201, after the air conditioner is turned on, obtaining a set temperature Ts and a set humidity Φs, and obtaining a set moisture content ds.

S202, obtaining a current indoor ambient temperature T1, a current indoor ambient humidity Φ1 and a current temperature of the indoor heat exchanger coil T2, and obtaining a current moisture content dL and a current dew point temperature TL. Besides obtaining ds, dL and TL by looking up in Table 1 and Table 2 in above embodiments, a relational expression between temperature, humidity and moisture content and a relational expression between temperature, humidity and dew point temperature may be fitted through a large number of experiments. Then, ds, dL and TL may be calculated according to Ts, Φs, T1, Φ1 and above two relational expressions.

S203, controlling the compressor and the electronic expansion valves to be at a set state(s). Set state(s) refer to, operational rules of the compressor which are set according to a current indoor ambient temperature and the set temperature, and switching states of the electronic expansion valves.

S204, comparing Ts and T1, and comparing ds and dL. Comparison results are in S205, S214, S221 and S227.

S205, Ts≤T1 and ds≤dL.

S206, controlling the air conditioner to perform cooling and dehumidification. If Ts≤T1, there's still a need to decrease the indoor ambient temperature; if ds≤dL, that means the indoor humidity is relatively high, there's a need for dehumidification.

S207, judging whether the compressor is operating at a maximum frequency. If true, executing step S209; if false, executing step S209 after executing step S208.

S208, controlling the compressor to operate at the maximum frequency. By controlling the compressor to operate at an upper limiting frequency, cooling can be faster.

S209, comparing T2 and TL. Comparison results are in S210 and S212.

S210, T2>TL.

S211, controlling an air flow rate of the indoor fan to decrease to a minimum air flow. If T2>TL, the indoor heat exchanger coil has no dehumidification effect, under this condition, controlling the air flow rate of the indoor fan to decrease for dehumidification.

S212, T2≤TL.

S213, maintaining a current operational state. If T2≤TL, the indoor heat exchanger coil has dehumidification effect, under this condition, just maintaining a current operational state.

S214, Ts≤T1 and ds>dL.

S215, controlling the air conditioner to perform cooling and humidity retaining. If Ts≤T1, there's still a need to decrease an indoor ambient temperature; if ds>dL, that means an indoor humidity is relatively low, there's no need for dehumidification.

S216, comparing T2 and TL. Comparison results are in S217 and S219.

S217, T2>TL.

S218, maintaining a current operational state. If T2>TL, the indoor heat exchanger coil has no dehumidification effect, under this condition, just maintaining a current operational state.

S219, T2≤TL.

S220, controlling the air flow rate of an indoor fan to increase by 10%. If T2≤TL, the indoor heat exchanger coil has dehumidification effect, under this condition, controlling the air flow rate of the indoor fan to increase, in order to reduce or stop dehumidification.

S221, Ts>T1 and ds≤dL.

S222, controlling the air conditioner to perform temperature retaining and dehumidification. If Ts>T1, that means the indoor ambient temperature reaches or lower than the set temperature; if ds≤dL, that means the indoor humidity is relatively high, there's a need for dehumidification.

S223, judging whether the compressor is operating at a minimum frequency. If true, executing step S225; if false, executing step S225 after executing step S224.

S224, controlling the compressor to operate at the minimum frequency. By controlling the compressor to operate at a lower limit frequency, cooling will be stop.

S225, judging whether the indoor fan is operating at a minimum air flow level. If true, returning to step S204; if false, returning to step S204 after executing step S226.

S226, controlling the indoor fan to operate at the minimum air flow level. By controlling the indoor fan to operate at a minimum air flow level, dehumidification can be faster.

S227, Ts>T1 and ds>dL.

S228, controlling the air conditioner to perform temperature retaining and humidity retaining. If Ts>T1, that means the indoor ambient temperature reaches or lower than the set temperature; if ds>dL, that means the indoor humidity is relatively low, there's no need for dehumidification.

S229, controlling the compressor to stop, leaving the air conditioner to operate as air flow supply.

The method may return to step S204 after steps S211, S213, S218, S220, S226 and S229, as a circulation for temperature and humidity control.

Therefore, while temperature and humidity is controlled based on judgment results of judging a magnitude relation between the set temperature and the current indoor ambient temperature, and judging a magnitude relation between the set moisture content and the current moisture content; temperature and humidity may also be controlled based on the current dew point temperature and the current temperature of an indoor heat exchanger coil. Therefore, a user's requirement for a comfortable sensation to both temperature and humidity can be satisfied, and effective control of humidity can be achieved without a need for additional humidity sensor, but only with a need for basic parts of the air conditioner, such that cost can also be reduced.

As corresponding to above embodiments, there is also provided a computer readable storage medium according to the present disclosure.

A computer readable storage medium according to an embodiment of the present disclosure has instructions stored thereon, when the instructions are executed, an air conditioner can implement a method for controlling the air conditioner as provided according to above embodiments.

The computer readable storage medium according to an embodiment of the present disclosure, can enable the air conditioner to sufficiently satisfy a user's requirement for comfortable humidity.

As corresponding to above embodiments, there is also provided an apparatus for controlling an air conditioner according to the present disclosure.

Figure 6:
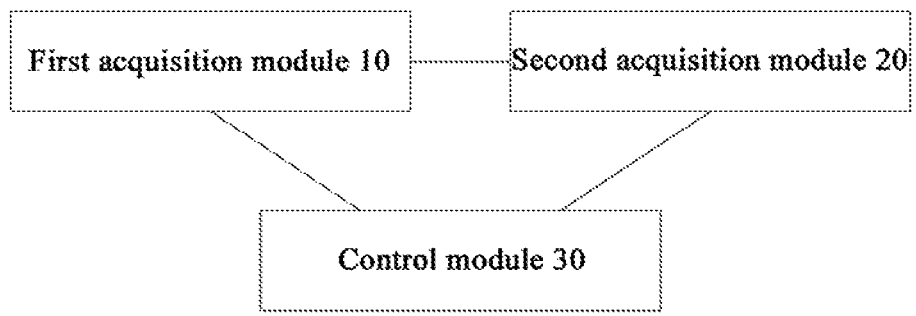
FIG. 6 is a block diagram illustrating an apparatus for controlling an air conditioner according to an embodiment of the present disclosure.

As shown in FIG. 6, the apparatus for controlling an air conditioner according to an embodiment of the present disclosure includes a first acquisition module 10, a second acquisition module 20, and a control module 30.

Where, the first acquisition module 10 is configured to obtain an initial indoor ambient temperature and an initial indoor ambient humidity, when the air conditioner is turned on; the second acquisition module 20 is configured to obtain an initial dew point temperature, according to the initial indoor ambient temperature and the initial indoor ambient humidity; the control module 30 is configured to control a temperature of an indoor heat exchanger coil of the air conditioner to be equal to the initial dew point temperature, and maintain a current operating frequency of a compressor of the air conditioner unchanged. The first acquisition module 10 is also configured to obtain a current indoor ambient temperature; the control module 30 is also configured to judge whether the current indoor ambient temperature is lower than or equal to a set temperature; the first acquisition module 10 is also configured to obtain a current indoor ambient humidity if the current indoor ambient temperature is lower than or equal to the set temperature; the second acquisition module 20 is also configured to obtain a current moisture content and a current dew point temperature, according to the current indoor ambient temperature and the current indoor ambient humidity; the control module 30 is also configured to control the air conditioner to perform humidification or dehumidification according to the temperature of the indoor heat exchanger coil, the current moisture content and the current dew point temperature.

Where, an initial indoor ambient temperature and an initial indoor ambient humidity refer to an indoor temperature and an indoor humidity when the air conditioner is turned on but has not yet affected the indoor temperature and the indoor humidity. An initial indoor ambient temperature and an initial indoor ambient humidity may be detected by the first acquisition module 10 via an indoor ambient temperature sensor and an indoor humidity sensor, respectively, of the air conditioner when the air conditioner is turned on.

In an embodiment of the present disclosure, a correspondence between temperature, humidity and dew point temperature may be obtained in advance by the second acquisition module 20, and the correspondence may be recorded and stored in a form of a table. Therefore, after obtaining the initial indoor ambient temperature and the initial indoor ambient humidity, the initial dew point temperature may be obtained by the second acquisition module 20 through looking up in the table.

In a specific embodiment of the present disclosure, a correspondence between temperature, humidity and dew point temperature may be shown in Table 1.

In an embodiment of the present disclosure, the temperature of an indoor heat exchanger coil may be controlled to increase or decrease by the control module 30 through adjusting an operating frequency of a compressor when the air conditioner is operating, so that the indoor heat exchanger coil temperature reaches the initial dew point temperature. When the temperature of the indoor heat exchanger coil reaches the initial dew point temperature, a current operating frequency of a compressor may be maintained unchanged.

Therefore, it is possible to prevent dehumidification due to a low temperature of the indoor heat exchanger coil during a cooling process of the air conditioner, and prevent indoor air from being dry.

A set temperature is a target temperature set by a user to the air conditioner. If the user does not set a temperature after turning on the air conditioner, a target temperature for the air conditioner set before a previous shutdown may be used as the set temperature.

While a current operating frequency of the compressor of the air conditioner is maintained unchanged, the current indoor ambient temperature may be obtained by the first acquisition module 10 through the indoor ambient temperature sensor, and compared with the set temperature by the control module 30.

The control module 30 may be configured to judge, when the current indoor ambient temperature is higher than the set temperature, whether the indoor ambient temperature remains unchanged within a first preset time, and control, if the indoor ambient temperature remains unchanged within the first preset time, to decrease the temperature of the indoor heat exchanger coil. In other words, when the indoor ambient temperature does not reach the set temperature, the temperature of the indoor heat exchanger coil can be appropriately controlled to decrease for cooling.

When the current indoor ambient temperature is lower than or equal to the set temperature, a temperature adjustment by the air conditioner has been completed, and then the control module 30 may control a humidification or dehumidification process according to an indoor humidity status.

The current indoor ambient humidity may be obtained by the first acquisition module 10 through an indoor ambient humidity sensor, and the current dew point temperature may be obtained by the second acquisition module 20 through looking up in Table 1.

In an embodiment of the present disclosure, a correspondence between temperature, humidity and moisture content may be obtained in advance by the second acquisition module 20, and the correspondence may be recorded and stored in a form of a table. Therefore, after obtaining the current indoor ambient temperature and the current indoor ambient humidity, the current moisture content may be obtained by the second acquisition module 20 through looking up in the table.

In a specific embodiment of the present disclosure, the correspondence between temperature, humidity and moisture content may be shown in Table 2.

The control module 30 may be configured to judge the current moisture content, and judge a magnitude relation between the temperature of the indoor heat exchanger coil and the current dew point temperature. The control module 30 is configured to control to decrease a rotational speed of an indoor fan of the air conditioner for dehumidification, if the current moisture content is greater than a first preset value and the temperature of the indoor heat exchanger coil is higher than the current dew point temperature; the control module 30 is configured to control to increase a rotational speed of the indoor fan of the air conditioner for humidification, if the current moisture content is lower than a second preset value and the temperature of the indoor heat exchanger coil is lower than the current dew point temperature, where the second preset value is lower than the first preset value.

According to an embodiment of the present disclosure, the first preset value is a moisture content corresponding to a temperature of 26° C. and a humidity of 60%, the value of which is 12.79; the second preset value is a moisture content corresponding to a temperature of 26° C. and a humidity of 40%, the value of which is 8.47.

For the apparatus for controlling an air conditioner according to an embodiment of the present disclosure, when the air conditioner is turned on, the initial dew point temperature may be obtained by the second acquisition module according to the initial ambient condition, and the temperature of the indoor heat exchanger coil of the air conditioner may be maintained at the initial dew point temperature by the control module, in order to prevent the air conditioner from performing dehumidification during a cooling control process. After the indoor temperature reaches the set temperature of the air conditioner, the air conditioner can be controlled to perform humidification or dehumidification by the control module according to the temperature of the indoor heat exchanger coil, the current moisture content and the current dew point temperature. Therefore, a user's requirement for comfortable humidity can be sufficiently satisfied, and effective control of humidity can be achieved without a need for an additional humidity sensor, but only with a need for basic parts of the air conditioner, such that cost can also be reduced.

Figure 7:
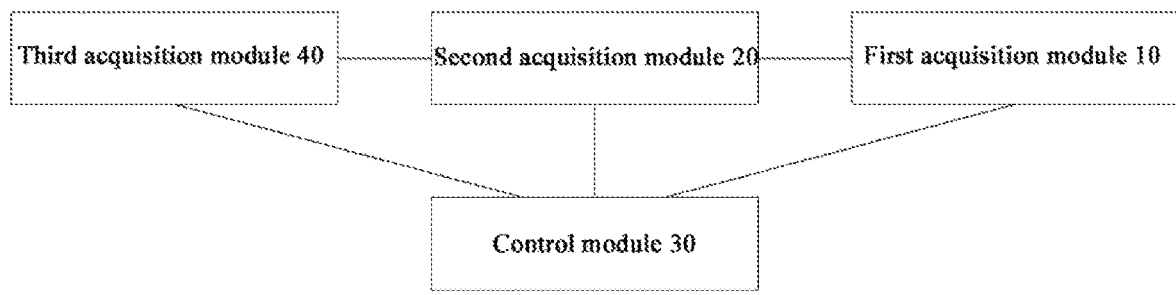
FIG. 7 is a block diagram illustrating an apparatus for controlling an air conditioner according to an embodiment of the present disclosure.

As shown in FIG. 7, the apparatus for controlling an air conditioner according to an embodiment of the present disclosure may also include a third acquisition module 40.

Where, the third acquisition module 40 is configured to obtain the set temperature and a set humidity, when the air conditioner is in cooling operation; the second acquisition module 20 is also configured to obtain a set moisture content, according to the set temperature and the set humidity. The first acquisition module 10 is configured to obtain a current indoor ambient temperature, a current indoor ambient humidity and a current temperature of the indoor heat exchanger coil, the second acquisition module 20 is configured to obtain a current moisture content and a current dew point temperature according to the current indoor ambient temperature and the current indoor ambient humidity; the control module 30 is configured to judge a magnitude relation between a set temperature and a current indoor ambient temperature, and judge a magnitude relation between a set moisture content and a current moisture content, and control temperature and humidity with the air conditioner, according to judging results, a current dew point temperature and a current temperature of the indoor heat exchanger coil.

When the air conditioner is turned on, a user may set parameters for the air conditioner. A set temperature, that is, a target temperature for an operation of the air conditioner, and a set humidity, that is, a target humidity for an operation of the air conditioner, etc. are input with a remote control, etc., such that the air conditioner may perform temperature and humidity regulation according to the set target temperature and target humidity. If a user does not set a temperature and a humidity for a current operation, a set temperature and a set humidity for the air conditioner set before a previous shutdown may be used as the set temperature and the set humidity for a current operation.

In an embodiment of the present disclosure, a correspondence between temperature, humidity and moisture content may be obtained in advance by the second acquisition module 20, and the correspondence may be recorded and stored in a form of a table. Therefore, after obtaining the set temperature and the set humidity, the set moisture content may be obtained by the second acquisition module 20 through looking up in a table.

In a specific embodiment of the present disclosure, the correspondence between temperature, humidity and moisture content may be shown in Table 2.

In an embodiment of the present disclosure, the first acquisition module 10 may be configured to obtain the current indoor ambient temperature, the current indoor ambient humidity and the current temperature of the indoor heat exchanger coil by an indoor ambient temperature sensor, an indoor ambient humidity sensor and an indoor heat exchanger coil temperature sensor arranged for the indoor heat exchanger coil, respectively.

Then, the current moisture content may be obtained by the second acquisition module 20 through looking up in Table 2 according to the current indoor ambient temperature and the current indoor ambient humidity.

In an embodiment of the present disclosure, a correspondence between temperature, humidity and dew point temperature may be obtained in advance by the second acquisition module 20, and the correspondence may be recorded and stored in a form of a table. Therefore, after obtaining the current indoor ambient temperature and the current indoor ambient humidity, the current dew point temperature may be obtained by the second acquisition module 20 through looking up in a table.

In a specific embodiment of the present disclosure, a correspondence between temperature, humidity and dew point temperature may be shown in Table 1.

The control module 30 is configured to control the air conditioner to perform cooling and dehumidification, if the set temperature is lower than or equal to the current indoor ambient temperature and the set moisture content is lower than or equal to the current moisture content; control the air conditioner to perform cooling and humidity retaining, if the set temperature is lower than or equal to the current indoor ambient temperature and the set moisture content is greater than the current moisture content; control the air conditioner to perform temperature retaining and dehumidification, if the set temperature is higher than the current indoor ambient temperature and the set moisture content is lower than or equal to the current moisture content; and control the air conditioner to perform temperature retaining and humidity retaining, if the set temperature is higher than the current indoor ambient temperature and the set moisture content is greater than the current moisture content.

Where, before controlling temperature and humidity with the air conditioner, the control module 30 may be configured to control the compressor of the air conditioner to operate with rules set according to the current indoor ambient temperature and the set temperature. That is to control an operation of the compressor with a goal of regulating the current indoor ambient temperature to the set temperature. If the current indoor ambient temperature is high relative to the set temperature, an operating frequency of the compressor is controlled to increase. If the current indoor ambient temperature is close to or just exceeds the set temperature, an operating frequency of the compressor is controlled to decrease.

The air conditioner according to an embodiment of the present disclosure may or may not include a dehumidification valve.

If the air conditioner includes a dehumidification valve, the air conditioner may be enabled to perform dehumidification, by controlling the dehumidification valve to perform throttling operation, and by controlling a throttling element to be at a fully open state.

Specifically, the air conditioner may include a compressor, an outdoor heat exchanger, a throttling element, and an indoor heat exchanger connected in sequence, and an indoor fan correspondingly arranged on the indoor heat exchanger, where a refrigerant piping of the indoor heat exchanger includes two parts, two ends of a part of the refrigerant piping are directly connected to the throttle element and the compressor; an end of another part of the refrigerant piping is connected to the throttling element through a dehumidification valve, and another end is connected to the compressor. Where, the dehumidification valve and the throttling element may be both electronic expansion valves.

A dehumidification device may be activated, by controlling the throttling element in above structure to be at a fully open state, and by controlling the dehumidification valve to perform throttling operation. Now high-temperature and high-pressure gaseous state refrigerant from the compressor transform into high-temperature and high-pressure liquid state refrigerant after heat exchange through the outdoor heat exchanger, then part of the high-temperature and high-pressure liquid state refrigerant directly enter a part of the refrigerant piping of the indoor heat exchanger for heat exchange, after that, transforming into low-temperature and low-pressure liquid state refrigerant and flowing back to the compressor. Another part of high-temperature and high-pressure liquid state refrigerant transform into low-temperature and low-pressure liquid state refrigerant by throttling of the dehumidification valve, then flow back to the compressor after heat exchange through another part of the refrigerant piping of the indoor heat exchanger. Where, a part of the refrigerant piping of the indoor heat exchanger acts as a condenser to perform heating in an indoor space, another part of the refrigerant piping acts as an evaporator to perform substantial dehumidification in an indoor space, and thus realizing isothermal dehumidification in an indoor space to ensure comfortable indoor humidity.

It should be understood that when an opening degree of the dehumidification valve decreases, a capacity of dehumidification increases; when an opening degree of the dehumidification valve increases, a capacity of dehumidification decreases; when there's no need to activate the dehumidification device, the dehumidification valve may be controlled to be at a fully open state, and the throttling element may be controlled to perform throttling operation, i.e., to restore a normal working state.

If the air conditioner does not include a dehumidification valve, a rotational speed of the indoor fan may be controlled to decrease for dehumidification.

Temperature control may be realized by adjusting an operating frequency of the compressor.

According to above manners for dehumidification and temperature control, according to an embodiment of the present disclosure, the control module 30 may be configured to control the air conditioner to perform cooling and dehumidification, by executing following steps: controlling the compressor to operate at an upper limiting frequency, and judging whether the current temperature of the indoor heat exchanger coil is higher than the current dew point temperature when the compressor is operating at the upper limiting frequency; controlling an opening degree of the dehumidification valve of the air conditioner to decrease by a first preset opening degree, or controlling a rotational speed of an indoor fan of the air conditioner to decrease to a minimum rotational speed, if the current temperature of the indoor heat exchanger coil is higher than the current dew point temperature; controlling the air conditioner to maintain a current operational state, if the current temperature of the indoor heat exchanger coil is lower than or equal to the current dew point temperature.

The control module 30 may be configured to control the air conditioner to perform cooling and humidity retaining by executing following steps: judging whether the current temperature of the indoor heat exchanger coil is higher than the current dew point temperature; controlling the air conditioner to maintain a current operational state, if the current temperature of the indoor heat exchanger coil is higher than the current dew point temperature; controlling an opening degree of a dehumidification valve of the air conditioner to increase by a first preset opening degree, or controlling a rotational speed of an indoor fan of the air conditioner to increase by a first preset percentage, if the current temperature of the indoor heat exchanger coil is lower than or equal to the current dew point temperature.

The control module 30 may be configured to control the air conditioner to perform temperature retaining and dehumidification by executing following steps: controlling the compressor to operate at a lower limit frequency, and controlling a rotational speed of the indoor fan to decrease to a minimum rotational speed; judging whether the current temperature of the indoor heat exchanger coil is higher than the current dew point temperature, when the compressor is operating at the lower limit frequency and a rotational speed of the indoor fan is decreased to the minimum rotational speed; controlling an opening degree of a dehumidification valve of the air conditioner to decrease by a first preset opening degree, if the current temperature of the indoor heat exchanger coil is higher than the current dew point temperature; controlling the air conditioner to maintain a current operational state, if the current temperature of the indoor heat exchanger coil is lower than or equal to the current dew point temperature.

The control module 30 may be configured to control the air conditioner to perform temperature retaining and humidity retaining by executing following steps: controlling the compressor to stop.

Therefore, while the control module is configured to control temperature and humidity based on judgment results of judging a magnitude relation between the set temperature and the current indoor ambient temperature, and judging a magnitude relation between the set moisture content and the current moisture content; the control module may also be configured to control temperature and humidity based on the current dew point temperature and the current temperature of the indoor heat exchanger coil. Therefore, a user's requirement for a comfortable sensation to both temperature and humidity can be satisfied, and effective control of humidity can be achieved without a need for additional humidity sensor, but only with a need for basic parts of the air conditioner, such that cost can also be reduced.

As corresponding to above embodiments, there is also provided an air conditioner according to the present disclosure.

The air conditioner according to an embodiment of the present disclosure includes the apparatus for controlling an air conditioner provided by above-mentioned embodiments of the present disclosure. For detailed implementation manners, reference may be made to the foregoing embodiments, and to avoid redundancy, details will not be discussed in further detail here.

The air conditioner according to an embodiment of the present disclosure, can sufficiently satisfy a user's requirement for a comfortable humidity level.

In the description of the present disclosure, it should be understood that, terms such as "central," "longitudinal," "lateral," "length," "width," "thickness," "upper," "lower," "front," "rear," "left," "right," "vertical," "horizontal," "top," "bottom," "inner," "outer," "clockwise," "counter-clockwise," "axial," "radial" and "peripheral" should be construed to refer to the orientation as then described or as shown in the drawings under discussion. These relative terms are for convenience of description and do not require that the present disclosure be constructed or operated in a particular orientation, therefore should not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly includes one or more of the features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical connections, or electric connections; may also be direct connections, or indirect connections via intervening structures; may also be inner communications or interaction of two elements. The specific meaning of the above terms within the present disclosure may be understood by those skilled in the art according to particular circumstances.

In the present disclosure, unless specified or limited otherwise, a structure in which a first feature is "on" or "below" a second feature may include an embodiment in which the first feature is in direct contact with the second feature, and may also include an embodiment in which the first feature and the second feature are indirectly contacted via a middle medium. Furthermore, a first feature "on," "above" or "on top of" a second feature may include an embodiment in which the first feature is right or obliquely "on," "above" or "on top of" the second feature, or just means that the first feature is at a height higher than that of the second feature; while a first feature "below," "under" or "on bottom of" a second feature may include an embodiment in which the first feature is right or obliquely "below," "under" or "on bottom of" the second feature, or just means that the first feature is at a height lower than that of the second feature.

Reference throughout this specification to "an embodiment," "some embodiments," "one embodiment," "an example," "a specific example," or "some examples" means that a particular feature, structure, material, or characteristic described in connection with the embodiment or example are included in at least one embodiment or example of the present disclosure. In the specification, expressions of the above terms are not necessarily referring to the same embodiments or examples. Furthermore, the feature, structure, material, or characteristic described may be incorporated in a proper way in any one or more embodiments or examples. Moreover, those skilled in the art could combine different embodiments or different characteristics in embodiments or examples described in the present disclosure.

Although explanatory embodiments have been shown and described, it would be appreciated that the above embodiments are exemplary and should not be construed to limit the present disclosure, and changes, amendments, alternatives and modifications may be made by those skilled in the art within the scope of the present disclosure.

We claim:
1. A method for controlling an air conditioner comprising:
obtaining an initial indoor ambient temperature and an initial indoor ambient humidity in response to the air conditioner being turned on;
obtaining an initial dew point temperature according to the initial indoor ambient temperature and the initial indoor ambient humidity;
controlling a temperature of an indoor heat exchanger coil of the air conditioner to be equal to the initial dew point temperature, and maintaining a current operating frequency of a compressor of the air conditioner unchanged;
obtaining a current indoor ambient temperature;
judging whether the current indoor ambient temperature is lower than or equal to a set temperature;
in response to the current indoor ambient temperature being lower than or equal to the set temperature:
obtaining a current indoor ambient humidity; and
obtaining a current moisture content and a current dew point temperature according to the current indoor ambient temperature and the current indoor ambient humidity; and
controlling the air conditioner to perform humidification or dehumidification according to the temperature of the indoor heat exchanger coil, the current moisture content, and the current dew point temperature.

2. The method of claim 1, further comprising:
judging, in response to the current indoor ambient temperature being higher than the set temperature, whether the indoor ambient temperature remains unchanged within a preset time; and
controlling, in response to the indoor ambient temperature remaining unchanged within the preset time, to decrease the temperature of the indoor heat exchanger coil.

3. The method of claim 2, wherein controlling the air conditioner to perform humidification or dehumidification according to the temperature of the indoor heat exchanger coil, the current moisture content, and the current dew point temperature includes:
judging the current moisture content, and judging a magnitude relation between the temperature of the indoor heat exchanger coil and the current dew point temperature;
controlling to decrease a rotational speed of an indoor fan of the air conditioner for dehumidification, in response to the current moisture content being greater than a first preset value and the temperature of the indoor heat exchanger coil being higher than the current dew point temperature; and
controlling to increase the rotational speed of the indoor fan of the air conditioner for humidification, in response to the current moisture content being lower than a second preset value and the temperature of the indoor heat exchanger coil being lower than the current dew point temperature, the second preset value being lower than the first preset value.

4. The method of claim 1, wherein controlling the air conditioner to perform humidification or dehumidification according to the temperature of the indoor heat exchanger coil, the current moisture content, and the current dew point temperature includes:
judging the current moisture content, and judging a magnitude relation between the temperature of the indoor heat exchanger coil and the current dew point temperature;
controlling to decrease a rotational speed of an indoor fan of the air conditioner for dehumidification, in response to the current moisture content being greater than a first preset value and the temperature of the indoor heat exchanger coil being higher than the current dew point temperature; and
controlling to increase a rotational speed of the indoor fan of the air conditioner for humidification, in response to the current moisture content being lower than a second preset value and the temperature of the indoor heat exchanger coil being lower than the current dew point temperature, the second preset value being lower than the first preset value.

5. The method of claim 4, wherein the first preset value is a moisture content corresponding to a temperature of 26° C. and a humidity of 60%, and the second preset value is a moisture content corresponding to a temperature of 26° C. and a humidity of 40%.

6. The method of claim 1, further comprising:
obtaining the set temperature and a set humidity while the air conditioner is in a cooling operation;
obtaining a set moisture content according to the set temperature and the set humidity;
obtaining the current indoor ambient temperature, the current indoor ambient humidity, and a current temperature of the indoor heat exchanger coil;
obtaining the current moisture content and the current dew point temperature according to the current indoor ambient temperature and the current indoor ambient humidity;
judging a magnitude relation between the set temperature and the current indoor ambient temperature and judging a magnitude relation between the set moisture content and the current moisture content to obtain judging results; and
controlling temperature and humidity with the air conditioner according to the judging results, the current dew point temperature, and the current temperature of the indoor heat exchanger coil.

7. The method of claim 6, wherein controlling temperature and humidity with the air conditioner according to the judging results, the current dew point temperature, and the current temperature of the indoor heat exchanger coil includes:
controlling the air conditioner to perform cooling and dehumidification in response to the set temperature being lower than or equal to the current indoor ambient temperature and the set moisture content being lower than or equal to the current moisture content;
controlling the air conditioner to perform cooling and humidity retaining in response to the set temperature being lower than or equal to the current indoor ambient temperature and the set moisture content being greater than the current moisture content;
controlling the air conditioner to perform temperature retaining and dehumidification in response to the set temperature being higher than the current indoor ambient temperature and the set moisture content being lower than or equal to the current moisture content; and
controlling the air conditioner to perform temperature retaining and humidity retaining in response to the set temperature being higher than the current indoor ambient temperature and the set moisture content being greater than the current moisture content.

8. The method of claim 7, further comprising, before controlling temperature and humidity with the air conditioner:

controlling the compressor of the air conditioner to operate according to rules set based on the current indoor ambient temperature and the set temperature.

9. The method of claim 7, wherein:
controlling the air conditioner to perform cooling and dehumidification includes:
  controlling the compressor to operate at an upper limiting frequency, and judging whether the current temperature of the indoor heat exchanger coil is higher than the current dew point temperature while the compressor is operating at the upper limiting frequency;
  in response to the current temperature of the indoor heat exchanger coil being higher than the current dew point temperature:
    controlling an opening degree of a dehumidification valve of the air conditioner to decrease by a preset opening degree; or
    controlling a rotational speed of an indoor fan of the air conditioner to decrease to a minimum rotational speed; and
  in response to the current temperature of the indoor heat exchanger coil being lower than or equal to the current dew point temperature, controlling the air conditioner to maintain a current operational state;
controlling the air conditioner to perform cooling and humidity retaining includes:
  judging whether the current temperature of the indoor heat exchanger coil is higher than the current dew point temperature;
  in response to the current temperature of the indoor heat exchanger coil being higher than the current dew point temperature, controlling the air conditioner to maintain a current operational state; and
  in response to the current temperature of the indoor heat exchanger coil being lower than or equal to the current dew point temperature:
    controlling the opening degree of the dehumidification valve of the air conditioner to increase by the preset opening degree; or
    controlling the rotational speed of the indoor fan of the air conditioner to increase by a preset percentage;
controlling the air conditioner to perform temperature retaining and dehumidification includes:
  controlling the compressor to operate at a lower limit frequency, and controlling the rotational speed of the indoor fan to decrease to the minimum rotational speed;
  judging whether the current temperature of the indoor heat exchanger coil is higher than the current dew point temperature while the compressor is operating at the lower limit frequency and the rotational speed of the indoor fan is decreased to the minimum rotational speed;
  in response to the current temperature of the indoor heat exchanger coil being higher than the current dew point temperature, controlling the opening degree of the dehumidification valve of the air conditioner to decrease by the preset opening degree; and
  in response to the current temperature of the indoor heat exchanger coil being lower than or equal to the current dew point temperature, controlling the air conditioner to maintain a current operational state; and controlling the air conditioner to perform temperature retaining and humidity retaining includes:
  controlling the compressor to stop.

10. An air conditioner comprising:
an indoor heat exchanger coil;
a compressor; and
a computer readable storage medium storing instructions that, when executed, cause the air conditioner to:
  obtain an initial indoor ambient temperature and an initial indoor ambient humidity in response to the air conditioner being turned on;
  obtain an initial dew point temperature according to the initial indoor ambient temperature and the initial indoor ambient humidity;
  control a temperature of the indoor heat exchanger coil to be equal to the initial dew point temperature, and maintain a current operating frequency of the compressor unchanged;
  obtain a current indoor ambient temperature;
  judge whether the current indoor ambient temperature is lower than or equal to a set temperature;
  in response to the current indoor ambient temperature being lower than or equal to the set temperature:
    obtain a current indoor ambient humidity; and
    obtain a current moisture content and a current dew point temperature according to the current indoor ambient temperature and the current indoor ambient humidity; and
  perform humidification or dehumidification according to the temperature of the indoor heat exchanger coil, the current moisture content, and the current dew point temperature.

11. The air conditioner of claim 10, wherein the instructions further cause the air conditioner to:
  judge, in response to the current indoor ambient temperature being higher than the set temperature, whether the indoor ambient temperature remains unchanged within a preset time; and
  control, in response to the indoor ambient temperature remaining unchanged within the preset time, to decrease the temperature of the indoor heat exchanger coil.

12. The air conditioner of claim 11, further comprising:
an indoor fan;
wherein the instructions further cause the air conditioner to perform humidification or dehumidification according to the temperature of the indoor heat exchanger coil, the current moisture content, and the current dew point temperature by:
  judging the current moisture content, and judging a magnitude relation between the temperature of the indoor heat exchanger coil and the current dew point temperature;
  controlling to decrease a rotational speed of the indoor fan for dehumidification, in response to the current moisture content being greater than a first preset value and the temperature of the indoor heat exchanger coil being higher than the current dew point temperature; and
  controlling to increase the rotational speed of the indoor fan for humidification, in response to the current moisture content being lower than a second preset value and the temperature of the indoor heat exchanger coil being lower than the current dew point temperature, the second preset value being lower than the first preset value.

13. The air conditioner of claim 10, further comprising:
an indoor fan;
wherein the instructions further cause the air conditioner to perform humidification or dehumidification according to the temperature of the indoor heat exchanger coil, the current moisture content, and the current dew point temperature by:
  judging the current moisture content, and judging a magnitude relation between the temperature of the indoor heat exchanger coil and the current dew point temperature;
  controlling to decrease a rotational speed of the indoor fan for dehumidification, in response to the current moisture content being greater than a first preset value and the temperature of the indoor heat exchanger coil being higher than the current dew point temperature; and
  controlling to increase the rotational speed of the indoor fan for humidification, in response to the current moisture content being lower than a second preset value and the temperature of the indoor heat exchanger coil being lower than the current dew point temperature, the second preset value being lower than the first preset value.

14. The air conditioner of claim 13, wherein the first preset value is a moisture content corresponding to a temperature of 26° C. and a humidity of 60%, and the second preset value is a moisture content corresponding to a temperature of 26° C. and a humidity of 40%.

15. The air conditioner of claim 10, wherein the instructions further cause the air conditioner to:
  obtain the set temperature and a set humidity while the air conditioner is in a cooling operation;
  obtain a set moisture content according to the set temperature and the set humidity;
  obtain the current indoor ambient temperature, the current indoor ambient humidity, and a current temperature of the indoor heat exchanger coil;
  obtain the current moisture content and the current dew point temperature according to the current indoor ambient temperature and the current indoor ambient humidity;
  judge a magnitude relation between the set temperature and the current indoor ambient temperature and judge a magnitude relation between the set moisture content and the current moisture content to obtain judging results; and
  control temperature and humidity according to the judging results, the current dew point temperature, and the current temperature of the indoor heat exchanger coil.

16. The air conditioner of claim 15, wherein the instructions further cause the air conditioner to control temperature and humidity according to the judging results, the current dew point temperature, and the current temperature of the indoor heat exchanger coil by:
  controlling the air conditioner to perform cooling and dehumidification in response to the set temperature being lower than or equal to the current indoor ambient temperature and the set moisture content being lower than or equal to the current moisture content;
  controlling the air conditioner to perform cooling and humidity retaining in response to the set temperature being lower than or equal to the current indoor ambient temperature and the set moisture content being greater than the current moisture content;
  controlling the air conditioner to perform temperature retaining and dehumidification in response to the set temperature being higher than the current indoor ambient temperature and the set moisture content being lower than or equal to the current moisture content; and
  controlling the air conditioner to perform temperature retaining and humidity retaining in response to the set temperature being higher than the current indoor ambient temperature and the set moisture content being greater than the current moisture content.

17. The air conditioner of claim 16, wherein the instructions further cause the air conditioner to, before controlling temperature and humidity with the air conditioner:
  control the compressor to operate according to rules set based on the current indoor ambient temperature and the set temperature.

18. The air conditioner of claim 16, further comprising:
a dehumidification valve; and
an indoor fan;
wherein the instructions further cause the air conditioner to:
  perform cooling and dehumidification by:
    controlling the compressor to operate at an upper limiting frequency, and judging whether the current temperature of the indoor heat exchanger coil is higher than the current dew point temperature while the compressor is operating at the upper limiting frequency;
    in response to the current temperature of the indoor heat exchanger coil being higher than the current dew point temperature:
      controlling an opening degree of the dehumidification valve to decrease by a preset opening degree; or
      controlling a rotational speed of the indoor fan to decrease to a minimum rotational speed; and
    in response to the current temperature of the indoor heat exchanger coil being lower than or equal to the current dew point temperature, controlling the air conditioner to maintain a current operational state;
  perform cooling and humidity retaining by:
    judging whether the current temperature of the indoor heat exchanger coil is higher than the current dew point temperature;
    in response to the current temperature of the indoor heat exchanger coil being higher than the current dew point temperature, controlling the air conditioner to maintain a current operational state; and
    in response to the current temperature of the indoor heat exchanger coil being lower than or equal to the current dew point temperature:
      controlling the opening degree of the dehumidification valve to increase by the preset opening degree; or
      controlling the rotational speed of the indoor fan to increase by a preset percentage;
  perform temperature retaining and dehumidification by:
    controlling the compressor to operate at a lower limit frequency, and controlling the rotational speed of the indoor fan to decrease to the minimum rotational speed;
    judging whether the current temperature of the indoor heat exchanger coil is higher than the current dew point temperature while the compressor is operating at the lower limit frequency and the rotational speed of the indoor fan is decreased to the minimum rotational speed;

in response to the current temperature of the indoor heat exchanger coil being higher than the current dew point temperature, controlling the opening degree of the dehumidification valve to decrease by the preset opening degree; and in response to the current temperature of the indoor heat exchanger coil being lower than or equal to the current dew point temperature, controlling the air conditioner to maintain a current operational state; and perform temperature retaining and humidity retaining by:

controlling the compressor to stop.

* * * * *